June 6, 1950 R. E. PAIGE 2,510,413
INSTRUCTIONAL TARGET SIGHTING DEVICE
Filed Feb. 6, 1945 2 Sheets-Sheet 1
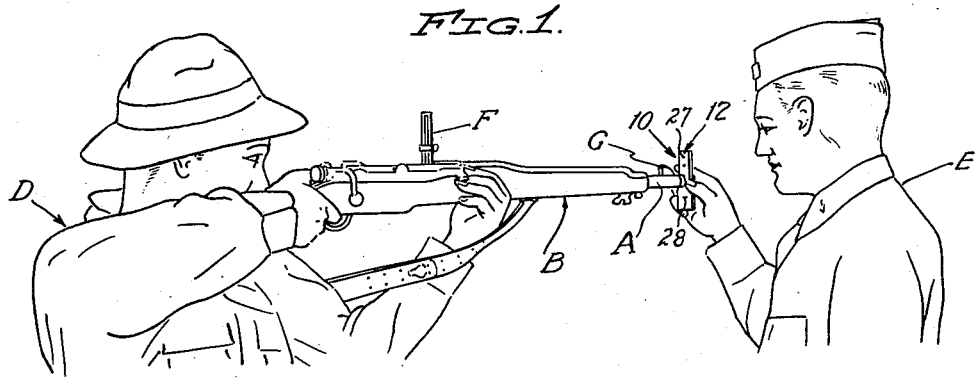
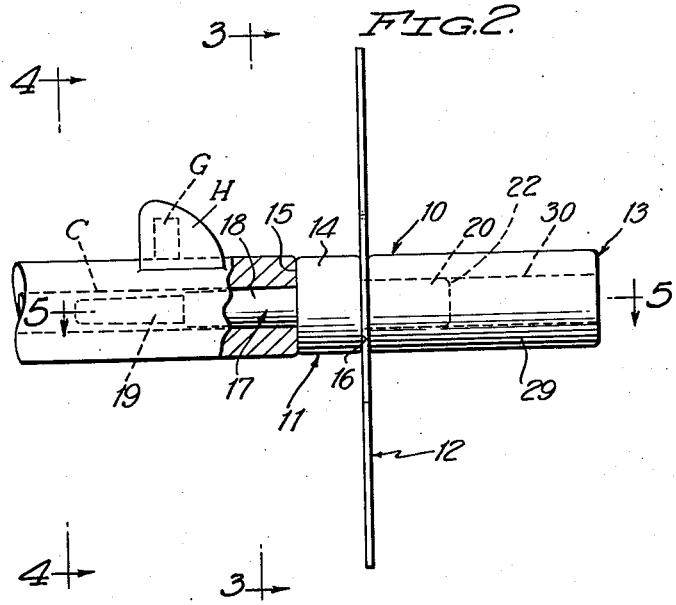
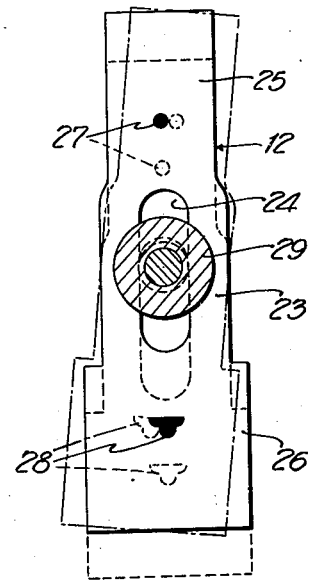
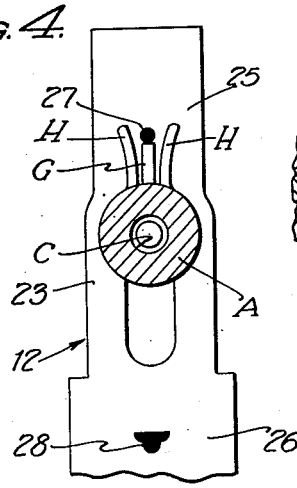
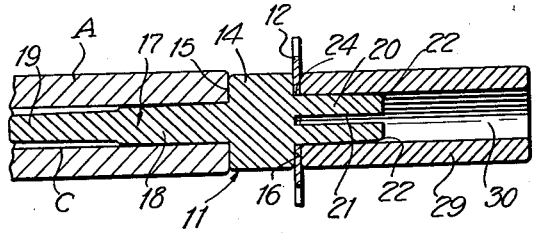
INVENTOR
RICHARD E. PAIGE
BY
Ely & Pattison
ATTORNEYS June 6, 1950 R. E. PAIGE 2,510,413
INSTRUCTIONAL TARGET SIGHTING DEVICE
Filed Feb. 6, 1945 2 Sheets-Sheet 2
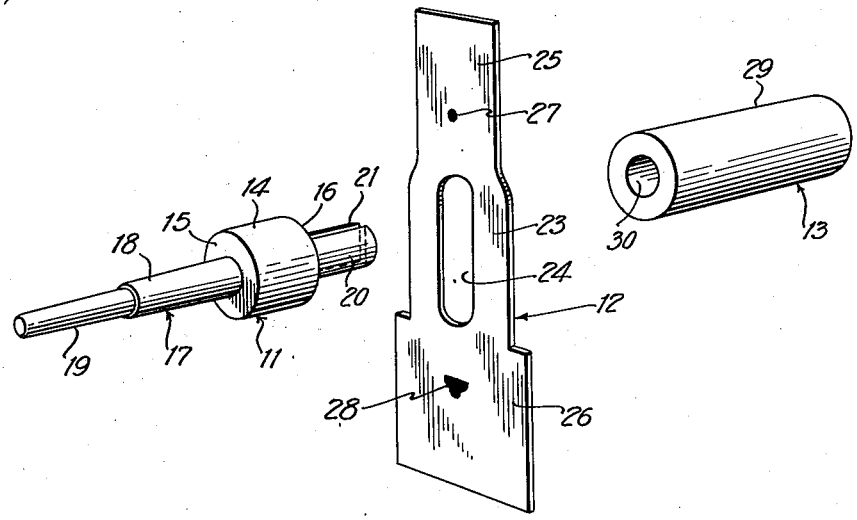
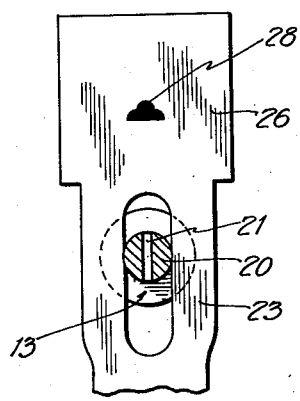
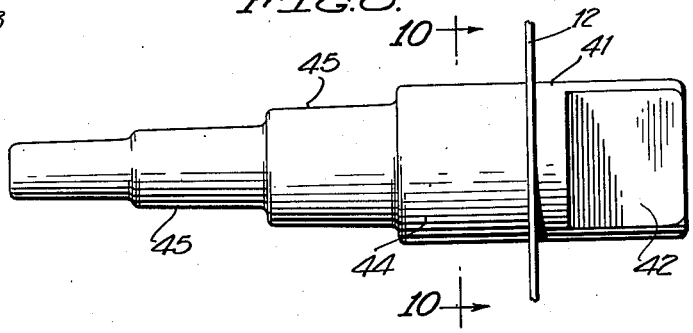
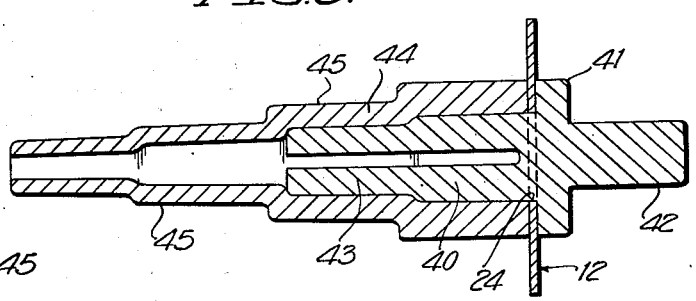
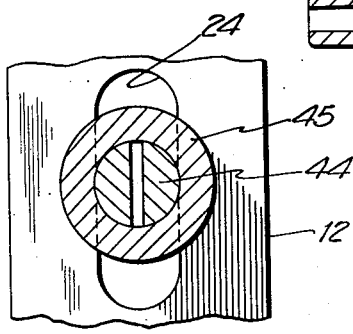
INVENTOR
RICHARD E. PAIGE
BY Ely & Pattison
ATTORNEYS Patented June 6, 1950

2,510,413

UNITED STATES PATENT OFFICE 2,510,413

INSTRUCTIONAL TARGET-SIGHTING DEVICE

Richard E. Paige, New York, N. Y.

Application February 6, 1945, Serial No. 576,497

9 Claims. (Cl. 35—25)

This invention relates to an instructional target-sighting device for use upon a rifle or other hand held firearm.

It has heretofore been considered standard practice when teaching a student rifleman the art of correctly aiming a rifle at a target in order to obtain a correct sight picture, to employ what is known as a sighting bar. This sighting bar is approximately six feet long, made of wood, and has mounted thereon imitation sights together with a means for supporting a target element at one end thereof. While a student may obtain a correct sight picture by the use of a sight bar he is not experiencing the same feel and obtaining the same sight picture which he obtains when actually sighting with the sights of a rifle. The student is therefore obliged to translate what he has learned by the sight bar practice to the sights of his rifle and he must subsequently be taught how to use the sights of his rifle. There are many benefits in training a student in the art of target sighting upon his own rifle, mainly, it familiarizes him with the intricacies of his rifle sights from the start of his instructions instead of teaching him target sighting on one device and expecting him to have learned enough to translate what he has learned to another unfamiliar device. It is therefore one of the important objects of this invention to consolidate the practice of target sighting and the use of rifle sights into a single instruction, which considerably reduces the instruction time necessary to efficiently train a student in the art of target sighting.

Another feature of the invention resides in an instructional target-sighting device which is supported upon the discharge end of a rifle without injury to the barrel or bore thereof.

A further feature of the invention is to provide an instructional target-sighting device in which the target element is adjustably supported in a novel manner to facilitate easy manipulation by the instructor while the rifle is held in steady aiming position by the student to permit alinement of the bull's-eye of the target element with the rifle sights in order to present a correct sight picture to the view of the student.

A further feature of the invention is the provision of an instructional target-sighting device which is supported in position by a stem inserted into the bore of the rifle. The stem is tapered outwardly in a manner to enable the same to be tightly fitted into the bores of varied caliber rifles, thus eliminating the necessity of manufacturing the devices in different caliber sizes.

Other novel features of the invention will become apparent as the following specification is read in conjunction with the accompanying drawings, in which, Figure 1 is a perspective view of the rifle target-sighting device in use.

Figure 2 is a side elevational view partly in section of the target-sighting device in position upon the end of the barrel of a rifle.

Figure 3 is a vertical transverse sectional view on the line 3—3 of Figure 2, the dotted lines illustrating the vertical adjustment and the dot and dash lines illustrating the radial adjustment of the target element.

Figure 4 is a vertical transverse sectional view on the line 4—4 of Figure 2, the bull's-eye of the target element being in correct sight with the guide sight of the rifle.

Figure 5 is a horizontal sectional view on the line 5—5 of Figure 2.

Figure 6 is a collective perspective view of the several parts of the target-sighting device in separated relation.

Figure 7 is a vertical transverse sectional view illustrating the target element in reverse position to bring a different shaped bull's-eye into sighting position.

Figure 8 is a side elevational view of a modified form of my invention.

Figure 9 is a vertical longitudinal sectional view of the device illustrated in Figure 8.

Figure 10 is a vertical transverse sectional view taken on the line 10—10 of Figure 8.

Referring to the drawings by reference characters and at present to the form of the invention illustrated in Figures 1 to 7 inclusive, the numeral 10 designates my instructional target-sighting device in its entirety which is composed of an attaching and supporting member 11, a target element 12, and a cap member 13.

The attaching and supporting member 11 is preferably constructed of wood but may be made of plastic which is less susceptible to expansion and contraction by atmospheric elements. The member 11 includes a cylindrical body 14 having flat end faces 15 and 16. Integral with the body 14 and extending beyond the end face 15 is a stem 17 which is concentric with the axis of the body. The stem 17 is round in cross section and gradually decreases in its diameter in an outwardly direction. The stem 17 may be a continuous taper from its inner to its outer end, but to reduce the length of the stem and render the same adaptable to fit two different diameter rifle bores, I provide an outwardly tapered inner stem portion 18 and a stepped reduced outer tapered stem portion 19.

Integral with the body 14 and extending from the flat end 16 thereof is a stud or pin 20. The pin 20 is round in cross section and is concentric with the body 14 and stem 17. The pin 20 is provided with a slot 21 extending inwardly from the free end thereof to render the same resilient and has rounded outer edges 22 to facilitate the easy insertion into the bore of the cap member 13 hereafter to be described.

The target element 12 is flat and substantially rectangular in shape and is constructed of stiff cardboard or plastic material. The target element 12 includes a central finger grip portion 23 having an elongated slot 24 therein which extends lengthwise of the element and is of a width substantially equal to the diameter of the pin 20. Integral with the central portion 23 is a reduced end portion 25 and an opposed enlarged end portion 26. Printed on one or both sides of the end portions 25 and 26 are bull's-eyes 27 and 28 respectively. The bull's-eye 27 is in the form of a round black dot while the bull's-eye 28 is a black silhouette of the head and shoulders of a human. The reduced end portion 25 imparts to the eye of a user the proportionate outline of a slow fire target while the wider end portion 26 imparts the proportionate outline of a rapid fire target, the size of said end portions being proportionate to the size of the respective bull's-eyes 27 and 28.

The cap member 13 is constructed of wood or plastic material and comprises a cylindrical body 29 having a central bore 30 extending therethrough. The diameter of the bore 30 is the same or a fraction less than the diameter of the resilient split pin 20 to tightly receive the pin for reasons to be hereinafter explained.

For use, the parts 11, 12 and 13 are assembled in the following manner. The split resilient pin 20 of the supporting member 11 is forcibly inserted through the slot 24 of the target element 12 until the flat shouldered face 16 abuts the front face of the target element 12. The split pin 20 is now in tight frictional engagement with the opposed side walls of the slot 24 so that the target element 12, under normal conditions, will not move relative to the pin. However, by grasping the mid-portion 23 of the target element the same may be slid back and forth at right angle to the axis of the pin as indicated in dotted lines in Figure 3 and turned on the axis thereof as shown in dot and dash lines in Figure 3 to obtain a correct sight picture as will be more fully explained hereinafter. The friction between the walls of the slot 24 and the resilient pin is sufficient to hold the target element 12 in any of its adjusted positions. To complete the assembly, the cap member 13 is inserted upon that portion of the split pin 20 which projects rearward of the target element 12. The pin 20 enters the bore 30 and when the inner end of the cap member abuts the rear face of the target element 12, it too acts to clamp the target in a fixed adjusted position against the shouldered face 16 of the supporting member. The cap member is held upon the split pin 20 against accidental separation by the friction between the pin and the walls of the bore 30. The cap member 13 also conceals the split pin and imparts a symmetrical appearance to the device as a whole.

In Figures 1 to 5 inclusive I have illustrated the instructional target-sighting device 10 as being mounted in position of use upon the discharge end of the barrel A of a rifle B. The soft tapered stem 17 is inserted into the open end of the rifle bore C of the barrel A for frictional wedging engagement therewith and without injury to the bore. With the target-sighting device 10 so positioned upon the barrel of the rifle, the student rifleman may now be handed the rifle for target sighting instructions. In Figure 1 of the drawings, I have illustrated a student rifleman D in the act of target sighting under the direction of an instructor E. The bull's-eye 27 of the target element 12 is presented to the front and rear sights F and G respectively of the rifle and it is the rifleman's task to aline the bull's-eye 27 with the sights F and G to obtain a correct sight picture. The sight G is protected by upstanding guard members H—H respectively disposed on opposite sides thereof. To obtain the correct sight picture, the instructor E grasps the mid-portion 23 of the target element 12 between his fingers so as not to interfere with the sight vision of the student, and under the directions of the student D, the instructor moves the target element up, down or sideways until the student informs him that he has obtained a correct sight picture. The student D now hands the rifle to the instructor E who, in turn, checks the accuracy of the student's sighting by placing the rifle to his own shoulder and looking through the sights thereof at the bull's-eye 27. To obtain a correct picture, the bull's-eye 27 should appear superposed over the sight G as illustrated in Figure 4.

Should it be desired to bring the silhouette bull's-eye 28 into target-sighting position, it is only necessary to impart a half revolution of the target element upon the axis of the pin 20.

In Figures 8 to 10 inclusive I have illustrated a modified form wherein the split pin 40 is formed integral with the cap member 41. The cap member 41 is formed with a flat finger grip portion 42 by which it may be gripped when inserting the pin 40 through the slot 24 of the target element 12. The split pin 41 is provided with a reduced portion 43 which fits into a reduced bore portion in the tubular stem 44. The stem 44 is provided with a series of tapered stepped portions 45 to facilitate the insertion of the stem into rifle bores of different diameters or caliber. The large end of the stem 44 frictionally fits onto the split pin 43 and cooperates with the cap member 41 for frictionally holding the target element 12 in various adjusted positions. By reason of the construction shown in Figures 8 to 10, the cap member 41 and stem 44 may be molded of plastic material.

While I have shown and described what I consider to be the most practical embodiments of my invention, I wish it to be understood that such changes in construction, material, and design as come within the scope of the appended claims may be resorted to if desired without departing from the spirit of my invention as herebefore set forth.

Having thus described my invention, what I claim as new and desire to secure by Letters Patent, is:

1. An instructional sighting device for firearms comprising in combination, a holder including a pair of separable frictionally telescoping sections, a stem extending from one of said sections adapted to frictionally fit into the bore of the barrel of a firearm at the discharge end thereof, a flat target element having an elongated slot therein, the inner of the telescoping sections passing through said slot, said sections having portions for engaging said element and maintaining same in adjusted position.

2. An instructional sighting device for firearms comprising in combination, a holder including a pair of telescoping sections, one of said sections having a stem for frictional fit into the bore of a firearm at the discharge end thereof, and a flat target element, the latter having an opening to permit said element to be shifted transversely of said holder and to be rotated with respect thereto, said sections being shaped to clamp said element between them in adjusted position.

3. An instructional sighting device comprising a flat target element having an elongated slot therein, a holder including a pair of separable inner and outer cylindrical telescoping sections having confronting shoulders, the inner section passing through said slot and disposed in tight frictional engagement with the walls thereof, said target element being disposed between said confronting shoulders, and a stem secured to one of said sections and extending axially therefrom for frictional fit into the discharge end of the bore of the barrel of a firearm.

4. An instructional target-sighting device comprising in combination, a holder including a body portion, a tapered stem extending from one end of the body portion for frictional fit into the bore of a rifle, a split resilient pin extending from the other end of said body; a target element comprising a flat elongated body having an elongated slot therein, a bull's-eye on the front face of said body beyond one end of said slot, said resilient pin extending through said slot in frictional engagement with the opposed walls thereof, and a cap member fitting upon the resilient pin in abutting engagement with the rear face of the body of the target element.

5. In an instructional target-sighting device for rifles, a target element having an elongated slot therein, a supporting member having a split resilient pin extending through the slot and in frictional engagement therewith, and an outwardly tapered stem member having a socket in its inner end into which the resilient pin tightly fits.

6. An instructional target-sighting device for rifles comprising a target element having an elongated slot therein, a holder for said target element including a pair of separable inner and outer telescoping sections, the inner section passing through said slot, said sections having portions shaped to engage the opposite faces of the target element to permit movement thereof relative to the axis of the sections and hold said element in adjusted position, and a stem on one of said sections and extending axially therefrom for frictional fit into the discharge end of the bore of the barrel of a rifle.

7. An instructional target-sighting device for rifles comprising a flat target element having an elongated slot intermediate the ends thereof, a holder for said target element including a pair of axially alined separable inner and outer telescoping sections having confronting shoulders, the inner section passing through said slot with the opposite flat sides of the target element in confronting relation to the respective shoulders, and a rigid stem on one of said sections extending axially therefrom for frictional fit into the discharge end of the bore of the barrel of a rifle.

8. An instructional target-sighting device comprising in combination, a holder including a body portion, a tapered stem extending from one end of the body portion for frictional fit into the bore of a rifle, a split resilient pin extending from the other end of said body; a target element comprising a flat elongated body having an elongated slot therein, a bull's-eye on the front face of said body beyond one end of said slot, said resilient pin extending through said slot, a cap member fitting upon the resilient pin, and means for lightly holding the target element between the body portion of the holder and said cap member for preventing accidental movement of the target element relative thereto.

9. An instructional target-sighting device for firearms comprising a body having a stem projecting from one end, said body having a shoulder at the junction thereof with said stem, the opposite end of the body having a stud and a shoulder at its junction with said stud, a flat target element having a longitudinal slot through which said stud passes, and a cap on the stud securing the target element against the last named shoulder in adjusted position, said element being movable rotatably and radially with respect to the axis of said body.

RICHARD E. PAIGE.

REFERENCES CITED

The following references are of record in the file of this patent:

UNITED STATES PATENTS

| Number | Name | Date |
| --- | --- | --- |
| 1,277,932 | Hollifield | Sept. 3, 1918 |